US007424420B2

(12) United States Patent
Polanyi et al.

(10) Patent No.: US 7,424,420 B2
(45) Date of Patent: Sep. 9, 2008

(54) SYSTEM AND METHOD FOR DYNAMICALLY DETERMINING THE FUNCTION OF A LEXICAL ITEM BASED ON CONTEXT

(75) Inventors: Livia Polanyi, Palo Alto, CA (US); Annie Zaenen, Redwood City, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 872 days.

(21) Appl. No.: 10/364,038

(22) Filed: Feb. 11, 2003

(65) Prior Publication Data
US 2004/0158452 A1 Aug. 12, 2004

(51) Int. Cl.
G06F 17/20 (2006.01)
(52) U.S. Cl. .............................. 704/8; 704/9
(58) Field of Classification Search .......... None
See application file for complete search history.

(56) References Cited

U.S. PATENT DOCUMENTS

| | | | |
|---|---|---|---|
| 5,870,709 A | 2/1999 | Bernstein | |
| 6,161,091 A | 12/2000 | Akamine | |
| 6,199,034 B1* | 3/2001 | Wical | 704/9 |
| 6,224,383 B1 | 5/2001 | Shannon | |
| 6,299,452 B1 | 10/2001 | Wasowicz | |
| 6,324,507 B1 | 11/2001 | Lewis | |
| 6,389,435 B1 | 5/2002 | Golovchinsky | |
| 6,622,140 B1* | 9/2003 | Kantrowitz | 707/5 |
| 6,999,914 B1* | 2/2006 | Boerner et al. | 704/1 |
| 2002/0083104 A1 | 6/2002 | Polanyi et al. | |
| 2002/0194230 A1 | 12/2002 | Polanyi et al. | |
| 2003/0110450 A1* | 6/2003 | Sakai | 715/529 |
| 2003/0212655 A1* | 11/2003 | Volcani et al. | 707/1 |

OTHER PUBLICATIONS

Mani, Inderjeet et al., "Machine Learning of Generic and User-Focused Summarization", *Proceedings Of The Fifteenth National/Tenth Conference On Artificial Intelligence/Innovative Applications Of Artificial Intelligence Table Of Contents*, pp. 820-826, (1998).

Martin J.R., "English Text: System and Structure," *Benjamins: Philadelphia and Amsterdam*, (1992), pp. 344-348.

Ansari, Daniel., et al., "Generating Warning Instructions by Planning Accidents and Injuries," *Department of Computer Science, University of Toronto*, Toronto, Ontario (1995) 10 pages.

Appelt, Douglas E., et al., Introduction to Information Extraction Technology, *Artificial Intelligence Center, SRI International*, pp. 1-41 (1999).

(Continued)

*Primary Examiner*—Richemond Dorvil
*Assistant Examiner*—Leonard Saint Cyr
(74) *Attorney, Agent, or Firm*—Fliesler Meyer LLP

(57) ABSTRACT

A method for adaptively determining the attitudinal function of a lexical item occurring in a natural language document, comprising determining a base valence of the lexical item; identifying a contextual valence shifter (CVS) wherein the lexical item is within scope of the CVS; and determining an actual valence of the lexical item by adjusting the base valence based on the CVS.

41 Claims, 2 Drawing Sheets

OTHER PUBLICATIONS

Barzilay, Regina et al., "Using Lexical Chains forText Summarization," *In Proceedings of the ACL'97/EACL'97 Workshop on Intelligent Scalable Text Summarization*, (1997) pp. 10-17.

Baxendale, P. B., "Machine-Made Index for Technical Literature—An Experiment," *IBM Journal of Research and Development*, vol. 2, No. 4, Oct. 1958, pp. 354-361.

Bryant, Gregory A. et al., Recognizing Verbal Irony in Spontaneous Speech, Lawrence Erlbaum Associates, Inc., University of California, Santa Cruz, *Metaphor and Symbol*, 17(2), pp. 99-117. 2002.

Cauldwell, Richard T., *Where did the Anger go? The Role of Context in Interpreting Emotion in Speech*, In Speech Emotion (2000), 127-131.

Corston-Oliver, Simon, *Text Compacting for Display on Very Small Screens*, in North American Chapter of the Association of Computational Linguist (NAACL) 2001 Language Technologies Workshops, Jun. 3-4, 2001.

Dalianis, Hercules, "Aggregation as a Subtask of Text and Sentence Planning," In J.H. Stewman (ed.), Proceedings of Florida AI Research Symposium, FLAIRS-96, pp. 1-5, Key West, Florida, May 20-22, 1996.

Edmundson, H.P., "New Methods in Automatic Extracting," *Journal of the Association For Computing Machinery*, vol. 16, No. 2, Apr. 1969, pp. 264-285.

Halliday, M.A.K., et al., "Cohesion in English," London:Longmans (1976).

Hovy, Eduard et al., " Automated text Summarization in SUMMARIST" *In Advances in Automatic Text Summarization*, 14 pages Aug. 8, 1997.

Joyce, Michael, "Storyspace as a Hypertext System for Writers and Readers of Varying Ability," *Hypertext 91* Proceedings, ACM, Baltimore (1991) pp. 381-389.

Kan, M.-Y, K. R. McKeown, and J. L. Klavans, *Applying Natural Language Generation to Indicative Summarization*, In Proc. of 8th European Workshop on Natural Language Generation, Toulouse, France, 2001. 9 pages.

Kupiec, Julian et al., "A Trainable Document Summarizer," *In Proceedings of the 18th ACM/SIGIR Annual Conference on Research and Development in Information Retrieval*, Seattle, Washington (Jul. 9-13, 1995) pp. 68-73.

Lin, Chin-Yew, "Knowledge-based Automatic Topic Identification," *In Proceedings of the 33rd Annual Meeting of the Association for Computational Linguistics* (ACL-95) (1995) pp. 308-310.

Lin, Chin-Yew et al., "Identifying Topics by Position," *In Proceedings of the Fifth Conference on Applied Natural Language Processing*, (ANLP-97) (1997) pp. 287-290.

Longacre, Robert E., "Discourse Analysis and Literacy," In Gorman, Thomas P. (editor) Language and Literacy, Tehran, Iran, International Association for Adult Literacy Methods (1977) 301, pp. 71-87.

Luhn, H.P., "The Automatic Creation of Literature Abstracts," *IBM Journal of Research and Development* vol. 2, No. 2, Apr. 1958, pp. 159-165.

Mani, Inderjeet et al., "Multi-Document Summarization by Graph Search and Matching," *In Proceedings of the Fourteenth National Conference on Artificial Intelligence* (AAAI-97) (1997) pp. 622-628.

Mann, William C. et al., "Rhetorical Structure Theory: Toward a Functional Theory of Text Organization," *Text* 8(3) (1988) pp. 243-281.

Marcu, Daniel, "Discourse Trees Are Good Indicators of Importance in Text," In I. Mani and M. Maybury editors, *Advances in Automatic Text Summarization*, The MIT Press, (1999) pp. 123-136.

Marshall, Catherine C. et al., "Aquanet: A Hypertext Tool to Hold Your Knowledge in Place," *Proceedings of Third ACM Conference on Hypertext Hypertext '91*, San Antonio, Texas (1991) pp. 261-275.

Mellish, C., Knott, A., Oberlander, J., & O'Donnell, M., *Experiments Using Stochastic Search for Text Planning*, In Proceedings of International Conference on Natural Language Generation, (1998) pp. 97-108.

Polanyi, L, "A Formal Model of the Structure of Discourse," *In: Journal of Pragmatics 12*, (1988) pp. 601-638.

Polanyi, L., "The Linguistic Structure of Discourse," *Institute for Logic, Language and Computation Faculty of Arts*, University of Amsterdam, Spuistraat 134, 1012 VB, Amsterdam, (Nov. 1995) pp. 1-64.

Polanyi, L., et al., "A Syntactic Approach to Discourse Semantics," *in Proceedings of the 6th International Conference on Computational Linguistics*, Stanford, California (1984).

Polanyi, L., et al., "Discourse Structure and Discourse Interpretation," *In Proceedings of the Tenth Amsterdam Colloquium*, ILLC, Amsterdam (1996).

Prüst, Hub et al., "Discourse Grammar and Verb Phrase Anaphora," *Linguistics and Philosophy*, (Aug. 1994) pp. 1-64.

Rambow, Owen et al., "Natural Language Generation in Dialog Systems," *In Proceedings of the First International Conference on Human Language Technology*, San Diego, CA (2001) 4 pages.

Rush, J.E., et al., "Automatic Abstracting and Indexing," Production of indicative abstracts by application of contextual inference and syntactic coherence criteria, *Journal of American Society for Information Sciences*, vol. 22, No. 4, Jul.-Aug. 1971, pp. 260-274.

Scott, Mike, et al., editors "Patterns of Lexis in Text," *Oxford University Press*, introduction page, (1991).

Sparck Jones, K., "What Might Be in a Summary?" *In Information Retrieval 93; Von der Modellierung zur Anwendung*, (1993b) pp. 9-26.

Stone, Matthew and Doran, Christine, 1997. "Sentence Planning as Description Using Tree Adjoining Grammar." In Proceedings of the 35 th Annual Meeting of the Association for Computational Linguistics (ACL97/EACL97). Madrid, Spain: Morgan Kaufmann, Palo Alto CA, 198-205.

Tatham, Mark et al., *Modelling Speech Prosodics for Synthesis-Perspectives and Trials*, IEE Seminar, State-Of-The-Art In Speech Synthesis, London, Apr. 2000.

Teufel, Simone, et al., "Sentence Extraction as a Classification Task," *In Proceedings of the ACL'97/EACL'97 Workshop on Intelligent Scalable Text Summarization* (1997) pp. 58-65.

Trigg, R., "Note Cards in a Nutshell," *Proc. ACM CHI+GI 87* (Toronto, Apr. 5-9, 1987) pp. 45-52.

Wichmann, A., *The Attitudinal Effects of Prosody, and How They Relate to Emotion*, (2000), 143-148.

Williams, Carl E., Emotions and Speech: Some Acoustical Correlates, in *The Journal of the Acoustical Society of America*, vol. 52, No. 4 (Part 2) 1972, pp. 1238-1250.

Mozziconacci, S.J.L. et al., *Role of Intonation Patterns in Conveying Emotion in Speech*, ICPhS99, San Francisco, pp. 2001-2004, (1999).

Connor, Ulla, *Constrastive Rhetoric Cross-cultural Aspects of Second-Language Writing*, Cambridge University Press, pp. 14-25, 1996.

Nakatani, Christine Hisayo, *The Computation Processing of Intonational Prominence: A Functional Prosody Perspective*, Thesis paper presented by author to Division of Engineering and Applied Sciences, Harvard University, Cambridge, Massachusetts, 116 pages, May 1997.

Pierrehumbert, Janet and Julia Hirschberg, The Meaning of Intonational Contours in the Interpretation of Discourse, Chapter 14 of *Intentions in Communication*, Cohen, Philip, et al., editors, 39 pages (1990).

Cauldwell, Richard, "Tones, Attitudinal Meanings, and Context", Speak Out! Newsletter of the IATEFL Pronunciation Special Interest Group, No. 21, Dec. 1997, pp. 30-35.

Skorochodko, E., "Adaptive Method of Automatic Abstracting and Indexing," *In Information Processing*, vol. 2, North-Holland Publishing Company (1971) pp. 1179-1182.

Grefenstette, Gregory, Producing intelligent telegraphic text reduction to provide an audio scanning service for the blind, In *AAAI 98 Spring Symposium on Intelligent Text Summarization*, pp. 111-117, 1998.

Maynard, Senko K. *Principles of Japanese Discourse: A Handbook*, Cambridge University Press, pp. 23-98, 1998.

Longacre, R.E., "An Anatomy of Speech Notions," *The Peter de Ridder Press, Lisse* (1976).

Halliday, M.A., et al., "Text and Context: Aspects of Language in a Social Semiotic Perspective," *Geelong: Vic.: Deakin University Press* (1985).

Marcu, Daniel "The Rhetorical Parsing of Natural Language Texts", *The Proceedings of the 35th Annual Meeting of the Association for Computational Linguistics*, (ACL'97/EACL'97) pp. 96-103, Madrid, Spain, Jul. 7-10, 1997.

Polanyi, L., et al., "On the Recursive Structure of Discourse," In: K. Ehrlich and H. van Riemsdijk (eds), *Connectedness in Sentence, Discourse and Text* (1983) Tilburg University, (1983) pp. 141-178.

\* cited by examiner

SYSTEM AND METHOD FOR DYNAMICALLY DETERMINING THE FUNCTION OF A LEXICAL ITEM BASED ON CONTEXT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCES

This application is related to the following co-pending applications which are each hereby incorporated by reference in their entirety: SYSTEM AND METHOD FOR SUMMARIZATION COMBINING NATURAL LANGUAGE GENERATION WITH STRUCTURAL ANALYSIS, U.S. application Ser. No. 10/231,732; Inventors: Livia Polanyi, et al., filed on Aug. 30, 2002; SYSTEM AND METHOD FOR DYNAMICALLY DETERMINING THE ATTITUDE OF AN AUTHOR OF A NATURAL LANGUAGE DOCUMENT, U.S. application Ser. No. 10/364,208, Inventors: Livia Polanyi, et al., filed on Feb. 11, 2003; SYSTEMS AND METHODS FOR DYNAMICALLY DETERMINING THE FUNCTION OF A LEXICAL ITEM BASED ON DISCOURSE HIERARCHY STRUCTURE, U.S. application Ser. No. 10/364,191, Inventors: Livia Polanyi, et al., filed on Feb. 11, 2003; and SYSTEMS AND METHODS FOR DYNAMICALLY DETERMINING THE ATTITUDE OF A NATURAL LANGUAGE SPEAKER, U.S. application Ser. No. 10/387,719, Inventors: Livia Polanyi, et al. filed on MAR. 13, 2003.

FIELD OF THE DISCLOSURE

The present invention disclosure relates to automatic analysis of natural language, and in particular, the dynamic determination of an author's attitudes towards entities and events discussed in the author's writing.

BACKGROUND

It is sometimes desirable to ascertain the attitude of an author of document towards entities or events described therein. For example, in the customer relations context it is important to ascertain whether the author of an electronic mail message has a positive or negative attitude towards a company's products and services. Some methods of attitude evaluation involve merely summing the number of terms in a document having positive versus negative connotations to derive a score for the document as a whole. For example, positive words can be assigned a positive value while negative words are assigned a negative value. In this approach, the sum of the values would represent the (positive or negative) attitude of the author. This approach is too simplistic, however, since it does not discriminate between entities or events discussed in the document, some of which the author may view in a positive light and others the author may view negatively. Another limitation of this approach is that it fails to take into account the influence that context can have on nominally positive or negative terms.

DETAILED DESCRIPTION

Figure 1:
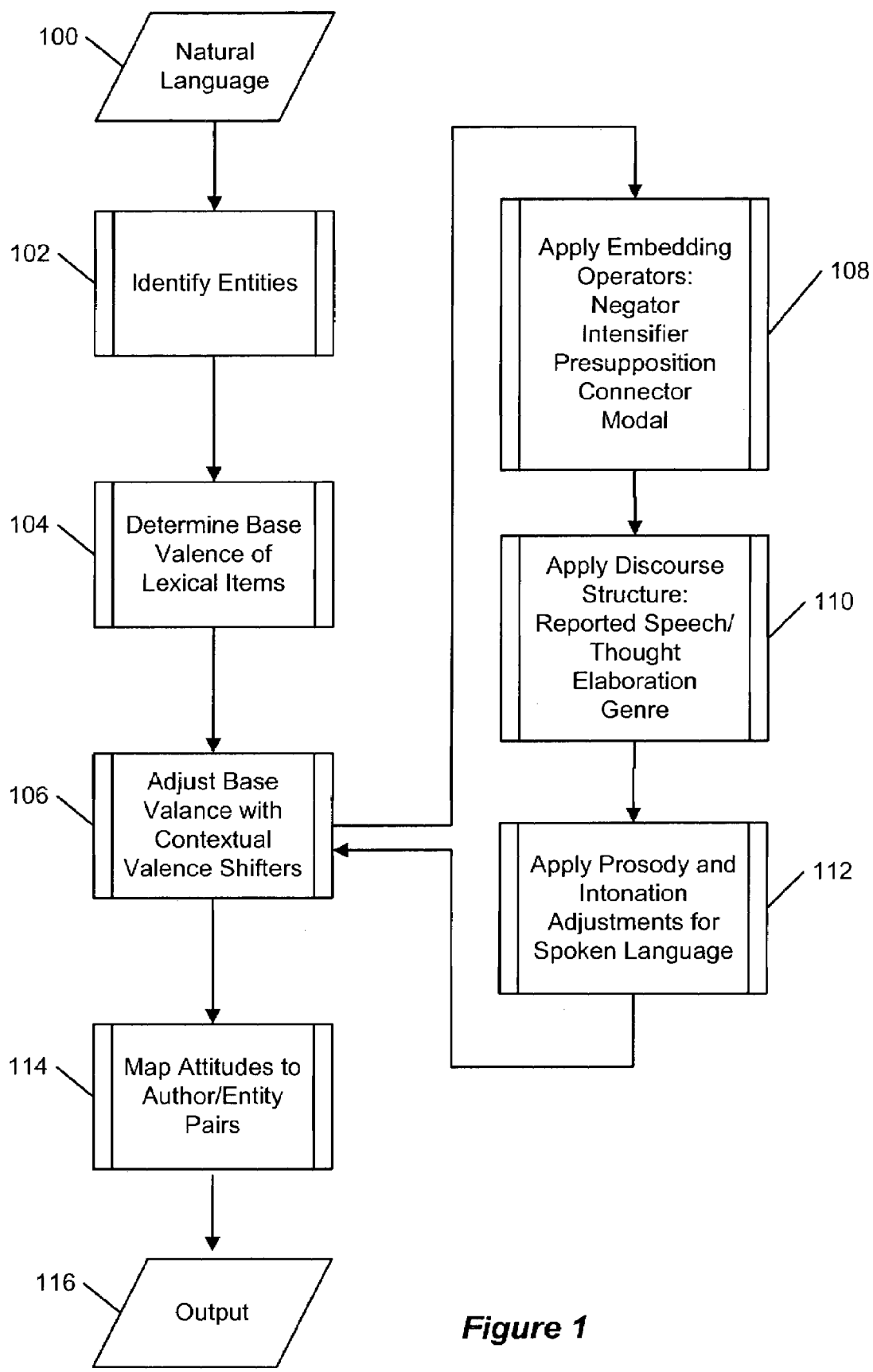
FIG. 1 is a flow chart illustrating one embodiment of the invention.

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Lexical items (e.g., words or phrases) encode a mixture of positive and negative information from which authors' attitudes or opinions regarding entities and events can be inferred. This encoded information is referred to as valence or connotation. For example, the words heroic and tragic used to describe the same event have entirely different connotations. Assuming that an author chooses words that aptly express the author's meaning, an event described as heroic is expressing the author's positive attitude towards the event. Whereas an author who refers to an event as tragic is taking the opposite stand.

Lexical items can also be used by an author to indirectly express an attitude. For example:

(1) John is inconsiderate.

(2) John arrived early. That was inconsiderate.

The sentence in text (1) above has a lexical item "inconsiderate" that carries with it a negative connotation reflecting the author's unenthusiastic assessment of the entity "John". However, in text (2) the same is accomplished indirectly. The first sentence in (2) has a lexical item "arrived early" that has either a neutral or positive connotation (as compared to "arrived late") reflecting the author's attitude towards the entity "John". But the second sentence in (2) contains the lexical item "inconsiderate" which refers to the act of John arriving early and indirectly implicates John. From this it can be inferred that the author is also expressing a negative assessment of John.

A natural language can be a language that humans use to communicate with each other, such as English, Japanese, French, Spanish, etc. This invention disclosure is not limited to or dependent on any particular natural language. A natural language document (hereinafter referred to as a "document") includes natural language communication and can be of any length. By way of a non-limiting example, a document can take many forms including but not limited to discourse (e.g., speech or conversation in spoken or written form), printed materials (e.g., newspaper, magazine articles, books, etc.), digital information (e.g., electronic mail messages, web pages, documents in electronic form, etc.), and interactive electronic forums (e.g., instant messaging, "chat" rooms, bulletin boards, etc.).

Generally speaking, entities discussed or alluded to in natural language documents can be persons, places, things, ideas, concepts, etc. Identification of entities or events in a document can be accomplished a number of ways, including using information extraction (IE) techniques. IE systems usually take as input a query that describes the information sought after and a template that specifies how the results of the query should be formatted. Two possible approaches to IE are knowledge engineering and automatic training. The knowledge engineering approach uses hand-crafted extraction rules based on domain patterns discovered by a human expert through analysis of a corpus. Automatic training systems learn extraction rules by analyzing texts that have been annotated (by a human expert) to point out which information is important. For purposes of this invention disclosure, the particular IE technique or system employed—whether currently existing or yet to be discovered—is immaterial.

IE systems can be "coarse-grained" or "fine-grained". At the "coarsest" level of entity extraction, there is the document itself. At a deeper or less coarse level, we have general topic or subject areas in the document. Deeper still, particular entities/events are identified. And so on. A coarse-grained system operates quickly but shallowly, allowing for fast operation but limited entity extraction. Fine-grained systems occupy the opposite end of the spectrum and can extract far more entities but at a slower speed. Of course, the type of extraction desired (i.e., shallow/coarse or deep/fine) can be tailored to the particular application area based on speed and depth requirements. In any case, a natural byproduct of IE is that the entities and events so extracted can be associated with the lexical items that directly or indirectly refer to them.

Generally speaking, lexical items can have a base valence or connotation that is positive, negative or neutral. In one embodiment, a lexical item's base valence could be stored in an electronic dictionary or lexical resource. In one embodiment, a negative or positive number can be associated with a lexical item to reflect its valence. By way of a non-limiting illustration, Table 1 lists English verbs, adjectives (and adverbs) and nouns which can be characterized as positively or negatively valenced.

TABLE 1

Base Valence of Exemplary Lexical Items

| PART OF SPEECH | POSITIVE | NEGATIVE |
|---|---|---|
| Verb | Boost, Ease, Embrace, Encourage, Ensure, Manage, Delight, Reassure | Conspire, Discourage, Fail, Fiddle, Haggle, Meddle |
| Noun | Approval, Benefit, Chance, Credit, Favor, Freedom, Hope, Incentive, Innovation, Justification, Promise, Reliability, Solution, Success | Backlash, Backlog, Bankruptcy, Beating, Catastrophe, Complacency, Destruction, Egotism, Failure, Frown, Grimace, Guilt, Jealous, Lie, Mortuary, Theft, Vanity |
| Adjective | Attractive, Better, Brave, Bright, Creative, Dynamic, Generous, Improving, Innovative, Reliable, Secure, Successful | Annoying, Arbitrary, Awry, Bad, Botched, Capricious, Counterproductive, Disappointing, Dreadful, Flawed, Guilty, Half-baked |
| Adverb | Attractively | Annoyingly |

Sometimes it is difficult to determine the base valence of a lexical item without considering the context in which it occurs. For example, the lexical item bankruptcy when applied to a financial event can be an objective description and not an evaluation. Given that the event itself is generally perceived as negative, the word tends to be used in a broader context as a negative term. For this reason, in one embodiment context or domain information could be included in an electronic dictionary or lexical resource to aid in the appropriate selection of the base valence of a lexical item based on how the lexical item is used in a document.

By way of a further non-limiting illustration, the following texts (3)-(5) all communicate the same set of facts but the connotative force of the three texts is quite different.

(3) The eighteen year old walked through the part of town where he lived. He stopped for a while to talk with people on the street and then went to a store for some food to bring to the small apartment where he lived with some people he knew.

(4) The young man strolled through the neighborhood where he lived. He lingered to chat with people on the street and then dropped into a shop for some goodies to bring home to the cozy place which he shared with some friends.

(5) The teenaged male strutted through his turf. He loitered to shoot the bull with people on the street and then ducked into a dive for some grub to bring to the cramped hole-in-the-wall where he crashed with his some cronies.

Text (3) above is a neutral text that presents the facts without much attitudinal assessment of them. The facts in Text (4) are essentially identical: no new factual information about the eighteen year old from (3) has been added. Yet the young man in (4) emerges as a sympathetic character due to the presence of lexical items such as "strolled", "chat", "cozy" and "friends". In Text (5) the pleasant young man of (4) has changed into a juvenile delinquent. The only differences between (3) (5) lies in the exact choice between valenced synonyms or near synonyms selected to describe the protagonist and his environs. These are summarized in Table 2.

TABLE 2

Valence of Synonyms

| TEXT (3): NEUTRAL VALENCE | TEXT (4): POSITIVE VALENCE | TEXT (5): NEGATIVE VALENCE |
|---|---|---|
| Eighteen year old | Young man | Teenaged male |
| walked | Strolled | Strutted |
| part of town | Neighborhood | Turf |
| stopped | Lingered | Loitered |
| Talk | Chat | shoot the bull |
| Store | Shop | Dive |
| Food | Groceries | Grub |
| Small apartment | Cozy Place | Cramped hole in the wall |
| Lived | Shared | Crashed |
| people | Friends | Cronies |

The actual valence of a lexical item in use in a particular context in a particular document is not necessarily identical with the base valence of the lexical item in a lexicon. To take a simple example, the sentence "John is not brilliant." The lexical item "brilliant" has a positive base valence, but the sentence does not express a positive evaluation of John's mental prowess. On the contrary, the negative term "not" when applied to "brilliant" effectively counteracts or shifts the valence of "brilliant" from positive to negative. Therefore, the base valence can change to reflect the context in which the lexical item occurs. Words, phrases or document properties that affect the valence of lexical items are referred to as contextual valence shifters (CVS's). A CVS can affect the base valence of lexical items in its scope. For example, the CVS "not" in "John is not brilliant" has lexical item scope—it only modifies the lexical item that follows it.

In one embodiment, a negator is a CVS that can invert the base valence of a lexical item. By way of a non-limiting example, negators can belong to various word classes (e.g., never, none, nobody, nowhere, nothing, neither, etc.). The combination of a positively valenced lexical item with a negator turns the evaluation as a whole into a negative one;

inversely the combination of a negator with a negatively valenced lexical item turns the whole into a positive evaluation.

TABLE 3

Negator and Intensifier Examples

| | DOCUMENT | ATTITUDE |
|---|---|---|
| (6) | John is *clever*$^{+1}$. | $A \xrightarrow{+1} John$ |
| (7) | John is not *clever*$^{+1}$. | $A \xrightarrow{-1} John$ |
| (8) | Each of them is *successful*$^{+1}$. | $A \xrightarrow{+1} Them$ |
| (9) | None of them is *successful*$^{+1}$. | $A \xrightarrow{-1} Them$ |
| (10) | John seldom is *successful*$^{+1}$ at tennis. | $A \xrightarrow{0} John + Tennis$ |
| (11) | John is always *successful*$^{+1}$ at tennis | $A \xrightarrow{+2} John + Tennis$ |
| (12) | John is less *successful*$^{+1}$ at tennis. | $A \xrightarrow{+0.5} John + Tennis$ |

By way of a non-limiting illustration, Table 3 depicts documents in the "DOCUMENT" column and corresponding attitude expressions in the "ATTITUDE" column. The base valence of lexical items in the DOCUMENT column is indicated with a superscript. For example, in document (6) the lexical item "clever" has a positive valence (+1). The corresponding attitude column contains an expression which relates an author (e.g., A), an attitude $$\xrightarrow{n},$$

and an entity (e.g., John). The author is by default the author of the document, but could be another as a document is not limited to a single author. The attitude symbol $$\xrightarrow{n}$$

expresses the author's attitude towards an entity as a positive or negative number n above the arrow. In one embodiment, n can be determined by summing the valence values of lexical items (referring to a particular entity/event) after they have been adjusted to reflect the influence of the contexts in which they occur. In another embodiment, n can be determined by a weighted average of lexical items (referring to a particular entity/event).

Referring to Table 3, document (6) has lexical item "clever" (in italic typeface for readability). In one embodiment, the base valence of "clever" can be +1, which is indicated by a superscript. The corresponding attitude expression reflects this as a positive attitude towards entity "John" (+1). Document (7) includes a negator "not" (in bold typeface for readability) indicating that it acts to negate the valence of lexical items in its scope. In this case, "not" negates the positive valence of "clever" resulting in a negative attitude expressed towards John (−1). Similar examples are provided in documents (8) and (9).

In one embodiment, CVS's can serve to attenuate or strengthen valence rather than negate it (e.g., "less" in "less efficient" or "deeply" in "deeply suspicious"). This type of CVS is referred to as an intensifier. Referring again to Table 3, documents (10)-(12) illustrate intensifiers. In one embodiment, intensifiers can reduce or increase the valence of lexical items in their scope. For example, in document (10) the lexical item "successful" which has a base valence of +1 has been neutralized by the intensifier "seldom". In document (11), the intensifier "always" has the effect of strengthening the positive value of "successful" (+2). In document 12, "less" weakens the valence of the "successful" (+0.5).

TABLE 4

Presupposition Examples

| | DOCUMENT | ATTITUDE |
|---|---|---|
| (13) | It is *sufficient*$^{+1}$. | $A \xrightarrow{+1} It$ |
| (14) | It is barely *sufficient*$^{+1}$. | $A \xrightarrow{0} It$ |
| (15) | He *barely*$^{-1}$ got into Foothill College. | $A \xrightarrow{-1} He$ |
| (16) | He *even*$^{+1}$ got into Harvard. | $A \xrightarrow{+1} He$ |
| (17) | He failed to tell me she had been in *jail*$^{-1}$. | $A \xrightarrow{-1} She$ |
| | | $A \xrightarrow{-1} He$ |
| (18) | The *brilliant*$^{+1}$ organizer failed to solve the *problem*$^{+1}$. | $A \xrightarrow{-1} Organizer$ |

In one embodiment, a presupposition can alter the valency of lexical items in its scope. Expectations that are not borne-out can have positive and negative consequences in terms of the valence of a lexical item under consideration. A presupposition not only conveys information that something has (or has not) happened but also that the author was expecting otherwise. Referring to Table 4, document (13) illustrates lexical item "sufficient" in one embodiment has a base valence of +1. The presupposition introduced by the CVS "barely" in (14) modifies "sufficient" to suggest that the author believed that "it" should have been sufficient, but hardly was. Therefore, the valence ascribed to "sufficient" is neutralized, reflecting the author's negative attitude towards the entity/event represented by "it".

In one embodiment, CVS's that would introduce presuppositions can have a negative or a positive connotation even when there are no lexical items in their scope. Referring again to Table 4, the term "barely" in document (15) leads to the conclusion that it should have been much easier for the entity referred to by "he" to get into Foothill College. Since this was not the case, the document reflects the author's negative assessment of the entity as delineated in the corresponding attitude expression. Likewise, document (16) illustrates that the author did not expect the entity referred to by "he" to get into Harvard, but he nonetheless did. The result is reflected as a positive attitude towards the entity (+1).

Document (17) in Table 4 illustrates an attitude expression involving more than one entity. One entity is referred to by "he" and the other by "she". The author expresses a negative attitude towards the entity referred to by "she" through the use of the lexical item "jail" which has a base valence of −1. Indirectly, the author is also expressing a negative assessment of the entity referred to by "he" through the use of a presupposition introduced by the term "failed" since the author expected that "he" should have shared this information with the author but did not. Use of a term that carries a presupposition can also lead to irony, as is the case in document (18). Here, the lexical item "solve the problem" has a positive base valence (+1) as does "brilliant" (+1). However, the presence of the term "failed" serves to neutralize the valence of "solve the problem". But there is also an indirect negative evaluation of the person to whom the failure is attributed. By ironically referring to the ineffective "organizer" as "brilliant", the author is also expressing a negative attitude towards the "organizer". Thus, the adjusted attitude is calculated by adding brilliant (−1)+solve the problem (0)=−1.

TABLE 5

Connector Examples

| | DOCUMENT | ATTITUDE |
|---|---|---|
| (19) | Although Boris is *brilliant*$^{+1}$ at math, he is a *horrible*$^{-1}$ teacher | $A \xrightarrow{-1} Boris$ |
| (20) | Experts believe that at least half of all Americans will have the *freedom*$^{+1}$ *to chose*$^{+1}$ their electricity supplier within the next five years. Yet many Americans remain deeply *suspicious*$^{-1}$. | $A \xrightarrow{-1} View\ of\ Deregulation$ |

In one embodiment, connectors such as "although", "however", "but", "on the contrary", "notwithstanding", etc. not only introduce information, they specifically act on information elsewhere in the text to mitigate the force of that information and thus serve as CVS's. For example, in document (19) (Table 5) while the statement "Boris is brilliant at math" positively assesses Boris' math skills, the force of "although" combined with the negative assessment in the sentence's main clause "he is a horrible teacher" effectively neutralizes the positive force of the evaluation as applied to Boris. In computing the author's attitude towards Boris, therefore, the effect of the connector "although" is to neutralize the effect of the positive assessment, resulting in a negative assessment score for the sentence.

In one embodiment, connectors that function within sentences (e.g., "however") can also function across sentences. By way of a non-limiting example, consider the first sentence in document (20) (Table 5). The valence of all attitude expressing terms in the first sentence is positive: freedom (+1), to choose (+1). The initial valence computation is +2. The second sentence begins with the connector "yet" which, unlike "although", applies to mitigate the force of information which precedes it. In this example, "yet" followed by negative valenced terms acts to neutralize the force of the positive terms in the preceding paragraph. Thus, in computing the attitude of the author towards American views of deregulation, the initial valence computation of the first sentence is recomputed to 0 and the sum score for both sentences is −1.

TABLE 6

Modal Examples

| | DOCUMENT | ATTITUDE |
|---|---|---|
| (21) | Mary is a *terrible*$^{-1}$ person. She is *mean*$^{-1}$ to her dogs. | $A \xrightarrow{-2} Mary$ |
| (22) | If Mary were a *terrible*$^{-1}$ person, she would be *mean*$^{-1}$ to her dogs. | $A \xrightarrow{0} Mary$ |

Natural language makes a distinction between events or situations which are asserted to have happened, are happening or will happen (realis events) and those which might, could, should, ought to, or possibly occurred or will occur (irrealis events). For example, "if" is a term which creates an irrealis context. The CVS's which set up a context of possibility or necessity are called modal operators and in documents they initiate a context in which lexical items express an attitude towards entities which does not necessarily reflect the author's attitude towards those entities in an actual situation under discussion. While, as is the case with individual connectives discussed above, precisely how each modal operator functions to modify base valence may differ, in one embodiment each operator will function to shift the valence in some manner and to some degree.

Referring to Table 6 and document (21), the lexical items "terrible" and "mean" are negatively valenced. The combined score for score for the sentences is −2. However, the sentence in document (22) does not assert either that Mary is a terrible person or that she is mean to her dogs. On the contrary, the force of "were" suggests that she is not mean to her dogs while the "if" sets up a context in which Mary is not necessarily a terrible person. Therefore, the modal operators neutralize the base valence of "terrible" and "mean", resulting in a neutral attitude expression. Similarly to some connectives (e.g., "however") modal context initiators may set up irrealis contexts that span more than one sentence. In such so-called modal subordination cases, all of the valence terms within the scope of the irrealis term are modified even though they may occur in different sentences.

In one embodiment, there are three CVS's which operate at the linguistic level of a discourse and modify the base valence of terms within their scope: Reported Speech and Thought, Elaboration, and Genre.

TABLE 7

Reported Speech and Thought Examples

| | DOCUMENT | ATTITUDE |
|---|---|---|
| (23) | Mary was a *slob*$^{-1}$. | $A \xrightarrow{-1} Mary$ |
| (24) | John said that Mary was a *slob*$^{-1}$. | $John \xrightarrow{-1} Mary$ |
| | | $A \xrightarrow{0} Mary$ |
| (25) | John said that Mary was a *slob*$^{-1}$ and he is *right*$^{+1}$. | $John \xrightarrow{-1} Mary$ |
| | | $A \xrightarrow{-1} Mary$ |
| | | $A \xrightarrow{+1} John$ |

TABLE 7-continued

Reported Speech and Thought Examples

| DOCUMENT | ATTITUDE |
|---|---|
| (26) The utilities argue that they performed glowingly$^{+1}$. But the public remembers those gloomy$^{-1}$, rotten$^{-1}$ nights. | $A \xrightarrow{-2}$ Utilities |

Table 7 contains examples illustrating Reported Speech and Thought CVS operators. In document (23), the attitude expression is −1 since "slob" has a base valence of −1. Document (24) introduces the reported speech operator "said". What is being asserted by the author in document (24) is that John "said" something unflattering about Mary, not that the author accepts John's assessment of her. Since it would not be contradictory for a text to read: "John said that Mary was a slob but she is not," items within the scope of a Reported Speech or Thought operator in one embodiment are not initially be computed into the score evaluating an author's belief. Therefore, while John expresses a negative attitude towards Mary, this does not figure into the attitude of the document's author (which in this case remains neutral or zero). However, it is possible that information later in the document could force its inclusion. This is the case in document (25) wherein the author is asserting that John said something unflattering about Mary and that the author agrees with John's assessment. Therefore, the negative valence attached to "slob" will be counted along with the positive valence of "right".

In document (26), both "argue" and "remembers" are examples of Reported Speech and Thought operators. Therefore, the valence of the reported material is initially not ascribed to the author. However, the "but" which sets up the contrast between what was argued and what was remembered has been chosen by the author to contrast mere arguing with remembering which, while expressing a mental state, is also assumed to pertain to events that did happen. The net result is that the utilities argument is ignored while the public's memory is included. In one embodiment, Reported Speech and Thought contexts can be detected using standard natural language processing techniques.

TABLE 8

Elaboration Examples

| DOCUMENT | ATTITUDE |
|---|---|
| (27) John walks a lot. Last month he walked 25 miles on Tuesdays. Wednesdays he walked another 25 miles. Every weekend he hikes at least 50 miles each day. | $A \xrightarrow{0}$ John |
| (28) John is a terrific$^{+1}$ athlete. Last week he walked 25 miles on Tuesdays. Wednesdays he walked another 25 miles. Every weekend he hikes at least 50 miles a day. | $A \xrightarrow{+4}$ John |
| (29) Through this year's sweltering$^{-1}$ summer, many homes from New York to New Orleans lost power (and with it, their air conditioning$^{+1}$). Downtown Chicago was plunged$^{-1}$ into darkness$^{-1}$ and the businesses were silenced$^{-1}$. A major university laboratory even$^{-1}$ lost decades of frozen samples. | $A \xrightarrow{-5}$ Utilities |

TABLE 8-continued

Elaboration Examples

| DOCUMENT | ATTITUDE |
|---|---|
| (30) John is a terrific$^{+1}$ athlete. Last week he slept 5 hours on Tuesday during the day. Wednesdays he napped for another 5 hours. Every weekend he spends at least 15 hours a day resting up in his hammock. | $A \xrightarrow{-4}$ John |

The second discourse CVS is Elaboration. Elaboration concerns the discourse structure itself and how it affects the base valence of lexical items. In one embodiment, a discourse structure be represented by a structural analysis of a source text (e.g. document) which represents the source text in terms of semantic relationships between units of the text. This can be accomplished by segmenting the source text into discourse units (DU's). DU's are portions of text small enough for the particular structural analysis technique employed to extract semantic meaning from and thereby build a semantically correct structural representation of the source text. Automatic segmentation of the source text can be accomplished by statistical methods or by shallow or deep parsing techniques. Statistical methods of segmentation use machine learning techniques to tag words and then aggregate strings of tagged words into structures that learning algorithms expect to correspond to DU's. Shallow parsing methods use tagged words and knowledge of some simple linguistic structures to break sentences into clauses and phrases. Deep parsing methods use word tagging and extensive rules to produced detailed analysis of the relations obtaining among the words making up a sentence.

Once a source text is segmented, a structural representation (e.g., a discourse tree) can be created based on semantic relationships among DU's. In one embodiment of the invention, two such relations are lists and elaborations. A list relationship involves associating DU's that express a similar relationship to some more general concept. An elaboration relation involves DU's that give more detailed information of some sort about other DU's preceding them in the linear organization of the text. These earlier DU's structurally dominate the elaborating DU's. Both symbolic and statistical natural language processing methods can be applied to determining discourse structure for documents in limited domains.

Table 8 illustrates documents in which elaboration operates through the structure of discourse to modify the base valence of lexical items. Document (27) is an example of an elaboration in which lexical valence does not play a role. For purposes of non-limiting illustration, each sentence in documents (27)-(30) corresponds to a DU and elaborating DU's are indented. The first sentence is considered the dominating DU. The last three sentences of document (27) each give more detail about John's walking a lot: last month he walked 5 miles on Tuesdays; Wednesdays he walked another 25 miles; and every weekend he hikes at least 50 miles each day. These sentences illustrate the concept in the dominating DU. In document (28), lexical valence information is introduced in "terrific" in the dominating DU. Since each of the dominated DU's is an example of athleticism, the positive valence of terrific is inherited by each DU. This can be paraphrased by saying, John's terrific athleticism is attested to by the fact that: 1) last week he walked 5 miles on Tuesdays; 2) Wednesdays he walked another 5 miles; and 3) every weekend he hikes at least 15 miles a day. Effectively, the score for this one instance of the positively valenced term "terrific" as applied to the entity John is multiplied by four.

In document (29), the elaborating DU's contain at least one negatively valenced lexical item that illustrate losing power during a sweltering summer. The negative valence of the elaborating items is −4. This can then be combined with the dominating DU's valence of −1, yielding an attitude expression of −5. This might be offset by "air conditioning", a positively valenced term. However, the positive air conditioning was lost, which neutralizes the positive force of air conditioning.

A related process can be used to determine in some cases if a valenced lexical item is being used ironically. Consider document (30). In contrast to the previous example of John's athletic ability, the elaborating information contradicts the positively valenced assertion in the dominating sentence, thereby effectively negating it. However, the effect of such an ironic use of language is stronger than merely neutralizing a positive or negative statement, rather the force of the rhetorical figure of irony can be computed as follows:

John is NOT a terrific athlete. Evidence for NOT: Last week he slept 5 hours on Tuesday during the day. Wednesdays he napped for another 5 hours Every weekend he spends at least 15 hours a day resting up in his hammock.

Adjusted valence is −4.

TABLE 9

Genre Example

| DOCUMENT | ATTITUDE |
|---|---|
| (31) This film should be $brilliant^{+1}$.<br>The characters are $appealing^{+1}$.<br>Stallone plays a $happy^{+1}$, $wonderful^{+1}$ man.<br>His $sweet^{+1}$ wife is beautiful and adores him.<br>He has a $fascinating^{+1}$ $gift^{+1}$ for living life to the fullest.<br>It sounds like a $great^{+1}$ story, however it *can't hold up*$^{-1}$. | $A \xrightarrow{-2} John$ |

Documents can display the hierarchical discourse structure discussed above. However, documents can also be created in conformity with document genre constraints. For example, an obituary in a newspaper reflects a set of organizing principles that dictate the order of information, the type of language used and the types of information considered appropriate. Similarly, an instructive manual, a product review, a persuasive article or a review of a movie will each display the form and stylistic conventions of the document genre to which it belongs. These document level genre constraints can be exploited in determining the attitude of authors towards the entities in the documents they create.

Table 9 contains an example of a movie review. A movie review can contain two types of information: information about the events and situations in the story and information about the film which has been created to tell the story. Information about the story can involve recounting the events in the story and talking about the characters played by the actors; information about the film can include descriptions and explicit evaluations of the acting, the directing, the script and other aspects of the production. In one embodiment, it is necessary to separate the description of the entities pertaining to the story from the description of the entities pertaining to the production. Only the valence scores of the entities pertaining to the production should be considered in ascertaining if the review is positive or negative.

Document (31) in Table 9 illustrates a common rhetorical strategy in reviews which is to present thwarted expectations: where the author sets up a deliberate contrast to an expected position. In the first sentence, "brilliant" is within the scope of presupposition "should" and is neutralized. In the second sentence, "appealing" is an elaboration under "should"—its effect is also neutralized. "Happy", "wonderful", "sweet", etc. all refer to story world entities and thus do not count. In the last sentence, the valence of "great" is reversed by the connector "however". Thus, the adjusted score for the document is −2.

In another embodiment, prosody and intonation can be used to adjust the valence of spoken lexical items. This approach is disclosed in SYSTEMS AND METHODS FOR DYNAMICALLY DETERMINING THE ATTITUDE OF A NATURAL LANGUAGE SPEAKER, U.S. application Ser. No. 10/387,719, Inventors: Livia Polanyi, et al., filed on Mar. 13, 2003, which is hereby incorporated by reference in its entirety.

FIG. 1 is a flow chart illustrating one embodiment of the invention. FIG. 1 depicts general method steps for illustrative purposes and in no way should be interpreted as limiting any embodiment to particular steps or a particular arrangement of steps. In addition, not all steps need be applied. Natural language document 100 is provided to step 102. Step 102 identifies entities/events in the document using any information extraction techniques currently in use or to be developed in the future. Depending on the granularity of the information extraction, fewer or greater numbers of entities will be identified. In one embodiment, step 102 maintains associations betweens identified entities and the lexical items that refer to them for use in step 114. Next, step 104 determines the base valence of lexical items in the document. In one embodiment, step 104 utilizes a lexical resource. In another embodiment, domain information is derived from the document to aid in determining the appropriate base valence. In yet another embodiment, step 104 can associate authors with lexical items as it determines base valence. Step 106 adjusts the base valence of the lexical items by taking into account the affect of CVS's in steps 108-112.

In Step 108, the affect of negators, intensifiers, presuppositions, connectors and modals can be determined. Negators can negate valence. Intensifiers can strengthen or weaken valence. Presuppositions can have a negative impact on valence if the consequences of a not born-out expectation are negative and can have a positive impact if the consequences are positive. Connectors indicate a different point of view and can neutralize or negate valence. Modals establish a condition wherein the condition can neutralize or negate the valence. In step 110, the affect of reported speech/thought, elaboration and genre constraints can be computed. Reported speech/thought describes a context in which attitude is ascribed to a document entity rather than a document author and can neutralize valence. Elaborations adjusts valence to reflect the valence of at least one elaborating lexical item that elaborates on a lexical item under consideration. Genre adjusts valence using knowledge of expected genre content (e.g., a movie review). If the natural language document contains spoken language, adjustments to the base valence based on prosody and intonation can be determined in step 112.

Finally, step 114 associates attitudes expressed by the adjusted valences determined in step 106 with their authors and target entities/events. In one embodiment, an author's attitude towards an entity/event can be expressed as the summation of all adjusted valences of lexical items attributable to the author that refer to the entity/event. This can be provided to output 116 as a set associations wherein each association comprises an author, an attitude and an entity/event.

Figure 2:
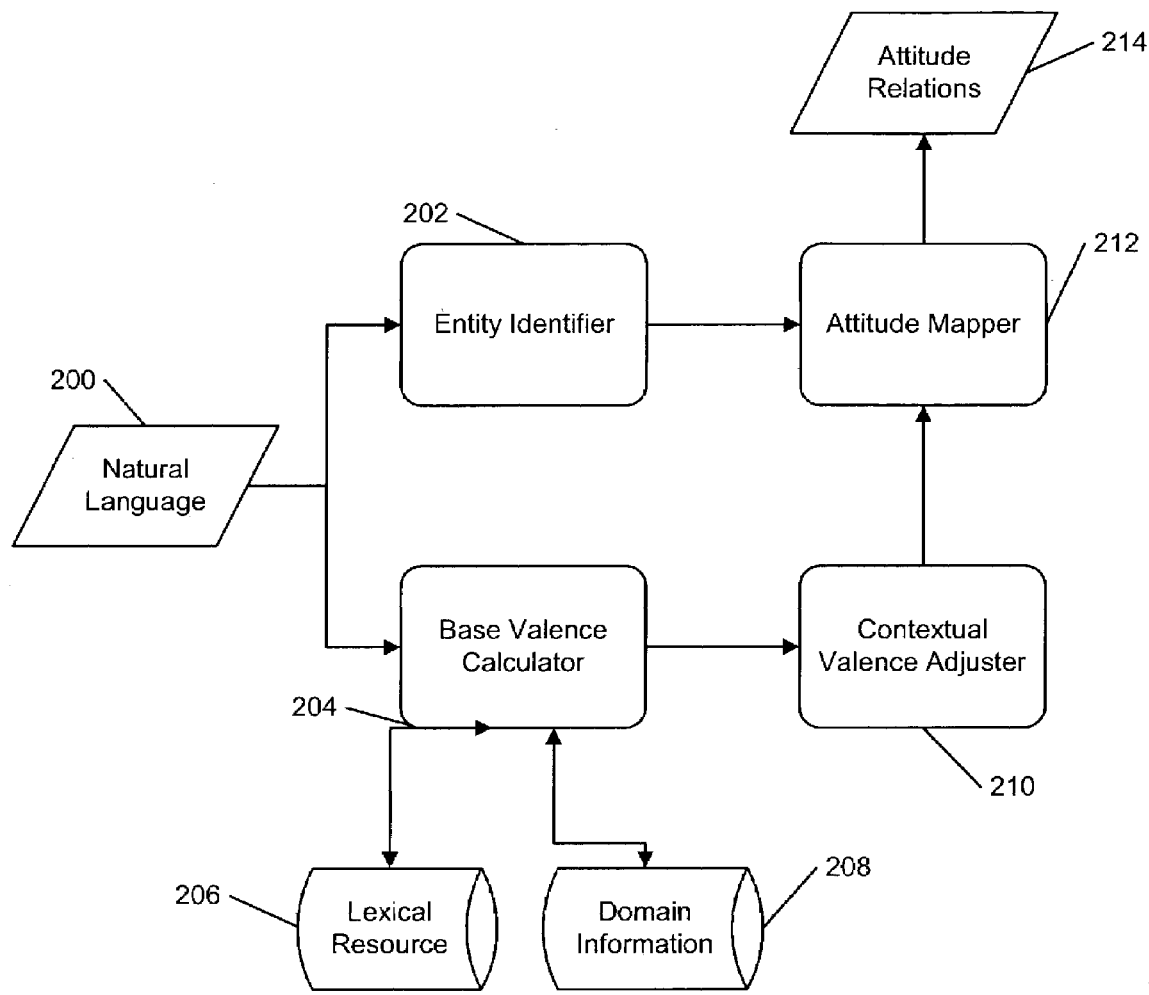
FIG. 2 is diagram of a system in accordance to one embodiment of the invention.

FIG. 2 is diagram of a system in accordance to one embodiment of the invention. Although this diagram depicts objects as functionally separate, such depiction is merely for illustrative purposes. It will be apparent to those skilled in the art that the objects portrayed in FIG. 2 can be arbitrarily combined or divided into separate software, firmware or hardware components. Furthermore, it will also be apparent to those skilled in the art that such objects, regardless of how they are combined or divided, can execute on the same computing device or can be arbitrarily distributed among different computing devices connected by a network.

Natural language document 200 is provided to entity identification module 202 and base valence calculator 204. Base valence calculator 204 determines the base valence for each lexical item in document 200. In one embodiment, base valence calculator 206 utilizes a lexical resource and domain information to determine the base valence of a lexical item. Contextual valence adjuster 210 is coupled to base valence calculator 204 and adjusts the base valence of lexical items based one or more CVS's. In one embodiment, module 210 associates attitudes expressed by the adjusted valences determined in step 106 with their authors and provides this information to attitude mapper 212. Entity identifier 202 identifies entities in document 200 and provides this information to attitude mapper 212. Attitude mapper 212 associates the entities provided by module 202 with the author/attitude pairs provided by module 210 to generate a set of attitude relations 214 that comprise an association between an author, an attitude and an entity/event.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method for adaptively determining the attitudinal function of a lexical item occurring in a natural language document, comprising:
   determining a base valence of the lexical item;
   identifying a contextual valence shifter (CVS) wherein the lexical item is within scope of the CVS;
   determining an actual valence of the lexical item by adjusting the base valence based on the CVS; and
   determining the attitudinal function of the lexical item, wherein the CVS has a negative impact on the base valence if the consequences of a not born-out expectation are negative and has a positive impact on the base valence if the consequences of the not born-out expectation are positive.

2. The method of claim 1 further comprising determining:
   at least one additional CVS, where the additional CVS is different from the CVS identified in claim 1, where the additional CVS is one of: a negator, an intensifier, a connector, and a modal.

3. The method of claim 2 wherein:
   The additional intensifier CVS is a word or phrase used for emphasis or de-emphasis that strengthens or weaken the base valence, respectively.

4. The method of claim 2 wherein:
   the additional connector CVS is a word or phrase that indicates a different point of view and neutralizes or negate the base valence.

5. The method of claim 2 wherein:
   the additional modal CVS is a word or phrase that establishes a condition wherein the condition neutralizes or negate the base valence.

6. The method of claim 1 wherein:
   the base valence represents positive or negative attitudinal information encoded in the lexical item.

7. The method of claim 1 wherein:
   determining the base valence is based on taking into account the domain in which the lexical item occurs.

8. The method of claim 1 wherein:
   determining the actual valence of the lexical item by adjusting the base valence based on a plurality of contextual valence shifters.

9. The method of claim 1 wherein:
   the lexical item can be a CVS.

10. The method of claim 1 wherein:
    the actual valence denotes an attitude of an author towards an entity or an event.

11. A method for adaptively determining the attitudinal function of a lexical item occurring in a natural language document, comprising:
    categorizing the lexical item as positive, negative or neutral to determine a base valence of the lexical item;
    analyzing the lexical item in context of a contextual valence shifter (CVS) to determine an actual valence of the lexical item;
    wherein the CVS has a negative impact on the base valence if the consequences of a not born-out expectation are negative and has a positive impact on the base valence if the consequences of the not born-out expectation are positive; and wherein the lexical item can be a CVS; and wherein the actual valence denotes an attitude of an author towards an entity or an event.

12. The method of claim 11 further comprising determining:
at least one additional CVS, where the additional CVS is different from the CVS of claim 11, where the additional CVS is one of: a negator, an intensifier, a connector, and a modal.

13. The method of claim 12 wherein:
the additional negator CVS is a word or phrase that can negate the base valence.

14. The method of claim 12 wherein:
The additional intensifier CVS is a word or phrase used for emphasis or de-emphasis that strengthens or weaken the base valence, respectively.

15. The method of claim 12 wherein:
the additional connector CVS is a word or phrase that indicates a different point of view and neutralizes or negate the base valence.

16. The method of claim 12 wherein:
the additional modal CVS is a word or phrase that establishes a condition wherein the condition neutralizes or negate the base valence.

17. The method of claim 11 wherein:
the base valence represents positive or negative attitudinal information encoded in the lexical item.

18. The method of claim 11 wherein:
determining the base valence is based on taking into account the domain in which the lexical item occurs.

19. The method of claim 11 wherein:
determining the actual valence of the lexical item by adjusting the base valence based on a plurality of contextual valence shifters.

20. A system for adaptively determining the attitudinal function of a lexical item occurring in a natural language document, comprising:
a base valence calculator to determine a base valence of the lexical item;
a contextual valence adjuster coupled to the base valence calculator, the contextual valence adjuster to determine an actual valence by adjusting the base valence based on a contextual valence shifter (CVS); and
an information extraction routine to determine the attitudinal function of the lexical item based on the actual valence, wherein the CVS is a presupposition; wherein the CVS has a negative impact on the base valence if the consequences of a not born-out expectation are negative and has a positive impact on the base valence if the consequences of the not born-out expectation are positive.

21. The system of claim 20 wherein:
the base valence calculator utilizes a thesaurus; and
wherein the thesaurus provides the base valence of the lexical item.

22. The system of claim 21 wherein:
the thesaurus uses domain information to determine the base valence.

23. The system of claim 20 wherein:
the base valence calculator analyzes the natural language document to determine a domain for the lexical item.

24. The system of claim 20 further comprising determining:
at least one additional CVS, where the additional CVS is not a presupposition, where the additional CVS is one of: a negator, an intensifier, a connector, and a modal.

25. The system of claim 24 wherein:
The additional intensifier CVS is a word or phrase used for emphasis or de-emphasis that strengthens or weaken the base valence, respectively.

26. The system of claim 24 wherein:
the additional connector CVS is a word or phrase that indicates a different point of view and neutralizes or negate the base valence.

27. The system of claim 24 wherein:
the additional modal CVS is a word or phrase that establishes a condition wherein the condition neutralizes or negate the base valence.

28. The system of claim 20 wherein:
the base valence represents positive or negative attitudinal information encoded in the lexical item.

29. The system of claim 20 wherein:
determining the actual valence of the lexical item by adjusting the base valence based on a plurality of contextual valence shifters.

30. The system of claim 20 wherein:
the lexical item can be a CVS.

31. The system of claim 20 wherein:
the actual valence denotes an attitude of an author towards an entity or an event.

32. A machine readable medium having instructions stored thereon that when executed by a processor cause a system to:
determine a base valence of the lexical item;
identify a contextual valence shifter (CVS) wherein the lexical item is within scope of the CVS;
determine an actual valence of the lexical item by adjusting the base valence based on the CVS; and
extract information to determine the attitudinal function of the lexical item based on the actual valence, wherein the CVS is a presupposition which has a negative impact on the base valence if the consequences of a not born-out expectation are negative and has a positive impact on the base valence if the consequences of the not born-out expectation are positive.

33. The machine readable medium of claim 32 further comprising determining:
at least one additional CVS, where the additional CVS is not a presupposition CVS, where the additional CVS is one of: a negator, an intensifier, a connector, and a modal.

34. The machine readable medium of claim 33 wherein:
The additional intensifier CVS is a word or phrase used to emphasis or de-emphasis that strengthens or weaken the base valence, respectively.

35. The machine readable medium of claim 33 wherein:
the additional connector CVS is a word or phrase that indicates a different point of view and neutralizes or negate the base valence.

36. The machine readable medium of claim 33 wherein:
The additional modal CVS is a word or phrase that establishes a condition wherein the condition neutralizes or negate the base valence.

37. The machine readable medium of claim 32 wherein:
the base valence represents positive or negative attitudinal information encoded in the lexical item.

38. The machine readable medium of claim 32 wherein:
determining the base valence is based on taking into account the domain in which the lexical item occurs.

39. The machine readable medium of claim 32 wherein:
determining the actual valence of the lexical item by adjusting the base valence based on a plurality of contextual valence shifters.

40. The machine readable medium of claim 32 wherein:
the lexical item can be a CVS.

41. The machine readable medium of claim 32 wherein:
the actual valence denotes an attitude of an author towards an entity or an event.

* * * * *